Oct. 28, 1924.
E. S. BERGLUND
1,513,307
METHOD FOR REFINING LEAD
Filed July 6, 1921
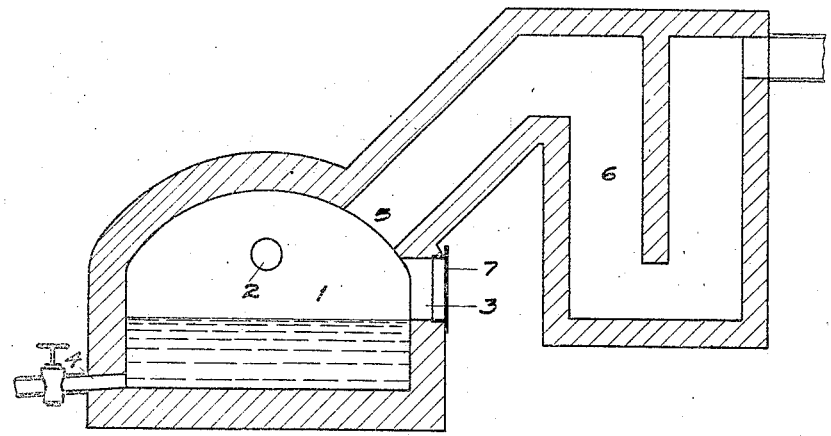
Inventor
E. S. Berglund,
By Marks & Clerk
Attys.

Patented Oct. 28, 1924.

1,513,307

UNITED STATES PATENT OFFICE.

EDWARD SALOMON BERGLUND, OF DJURSHOLM, SWEDEN, ASSIGNOR TO TROLLHÄTTANS ELEKTROTHERMISKA AKTIEBOLAG, OF STOCKHOLM, SWEDEN.

METHOD FOR REFINING LEAD.

Application filed July 6, 1921. Serial No. 482,818.

*To all whom it may concern:*

Be it known that I, EDWARD SALOMON BERGLUND, a subject of the King of Sweden, residing at Djursholm, Sweden, have invented certain new and useful Improvements in Methods for Refining Lead, for which I have filed an application in Sweden June 5, 1918, No. 2175/1918, and of which the following is a specification.

For refining lead as a rule reverberatory furnaces have been employed fired with gas or coal. As a very high temperature is necessary for carrying out the refining operation a considerable amount of zinc and lead escapes from the lead bath during the said operation. On account of the great amount of combustion gases with which the metal vapours and oxides are diluted said gases must be subjected to a filtering operation in sack houses if it be required to free the gases from the metals and oxides contained therein, which operation is very costly and troublesome.

In order to obviate these inconveniences the refining operation is carried out in an electric furnace according to the present invention. The advantage is thereby gained that the metallic vapours and oxides may be collected in a common condensation arrangement. Moreover, when electric current is employed as the heating means the refining operation will be better controlled owing to the easier manner in which the heat may be varied compared with when gas or a coal fire is employed.

For carrying out the above-described method the device illustrated on the accompanying drawing may be employed.

1 indicates an electric smelting furnace with electrodes 2, an opening 3 for introducing the lead and device 4 for drawing off the refined lead. 5 indicates the escape of metallic vapours and 6 a condenser of any suitable type for condensing said vapours.

Through the opening 3 which is provided with a shutter the lead to be refined is introduced whereafter the same is smelted by admitting the electric current. By introducing air and steam to the smelting chamber zinc, tin, antimony and other volatile impurities contained in the lead are oxidized whereby said oxides together with some oxidized lead form a scum on the surface of the lead bath, which scum from time to time is withdrawn.

Having now described my invention, what I claim as new and desire to secure by Letters Patent is:—

1. The method of refining impure lead, consisting in heating the lead by electric heat so as to volatilize impurities contained in the lead, condensing said volatilized impurities, oxidizing non-volatile impurities contained in the lead, withdrawing the scum thus generated and tapping off the refined metallic lead.

2. The method of refining impure lead, consisting in smelting the impure lead by electric heat; oxidizing non-volatile impurities contained in the lead,-in the presence of air and steam, and condensing impurities, volatile at the temperature of smelting the lead.

In testimony whereof I have signed my name to this specification.

EDWARD SALOMON BERGLUND.

Witnesses:
AGNES BJORCK,
SHIRA PHLIANDER.